United States Patent
Auberger et al.

(10) Patent No.: US 9,451,164 B2
(45) Date of Patent: Sep. 20, 2016

(54) VIDEO STABILISATION WITH DEBLURRING

(71) Applicant: ST-Ericsson SA, Plan-les-Ouates (CH)

(72) Inventors: Stephane Auberger, Noisy le Grand (FR); Antoine Chouly, Paris (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 97 days.

(21) Appl. No.: 14/405,478

(22) PCT Filed: May 30, 2013

(86) PCT No.: PCT/EP2013/061144
§ 371 (c)(1),
(2) Date: Dec. 4, 2014

(87) PCT Pub. No.: WO2014/001015
PCT Pub. Date: Jan. 3, 2014

(65) Prior Publication Data
US 2015/0138379 A1  May 21, 2015

Related U.S. Application Data

(60) Provisional application No. 61/671,259, filed on Jul. 13, 2012.

(30) Foreign Application Priority Data

Jun. 25, 2012  (EP) .................................. 12305736

(51) Int. Cl.
  *H04N 5/228*  (2006.01)
  *H04N 5/232*  (2006.01)
  *G06T 5/00*  (2006.01)
(52) U.S. Cl.
  CPC ........... *H04N 5/23267* (2013.01); *G06T 5/003* (2013.01); *H04N 5/23254* (2013.01); *G06T 2207/20201* (2013.01)

(58) Field of Classification Search
  CPC .................................................. H04N 5/23267
  See application file for complete search history.

(56) References Cited

U.S. PATENT DOCUMENTS

| | | | |
|---|---|---|---|
| 6,628,711 B1 | 9/2003 | Mathew et al. | |
| 2006/0257042 A1 | 11/2006 | Ofek et al. | |
| 2009/0213234 A1* | 8/2009 | Chen | H04N 5/23248 348/208.4 |
| 2010/0003024 A1* | 1/2010 | Agrawal | H04N 5/23229 396/340 |

FOREIGN PATENT DOCUMENTS

WO  2007/020569 A2  2/2007

OTHER PUBLICATIONS

International Search Report issued in corresponding International application No. PCT/EP2013/061144, date of mailing Jul. 1, 2013.
Written Opinion of the International Searching Authority issued in corresponding International application No. PCT/EP2013/061144, date of mailing Jul. 1, 2013.
Extended European Search Report issued in corresponding European application No. EP 12 30 5736, date of completion of the search Dec. 6, 2012.
Lagendijk, Reginald L. et al., "Basic Methods for Image Restoration and Identification," Handbook of Image and Video Processing, Elsevier Academic Press, editor Al Bovik, SD Edition 2005.

* cited by examiner

*Primary Examiner* — Gary C Vieaux
(74) *Attorney, Agent, or Firm* — Patent Portfolio Builders PLLC

(57) ABSTRACT

Methods of processing a frame in a video sequence of digital images are provided. The methods include determining a global motion vector for the frame relative to a previous frame in the sequence, deriving a jitter function from the global motion vector, the jitter function including an estimate of undesired motion of the frame relative to the previous frame, and determining whether the frame is blurred above a first predetermined threshold. If the frame is blurred above the first predetermined threshold, stabilizing the frame using the jitter function and applying a deblur function to the frame.

14 Claims, 3 Drawing Sheets

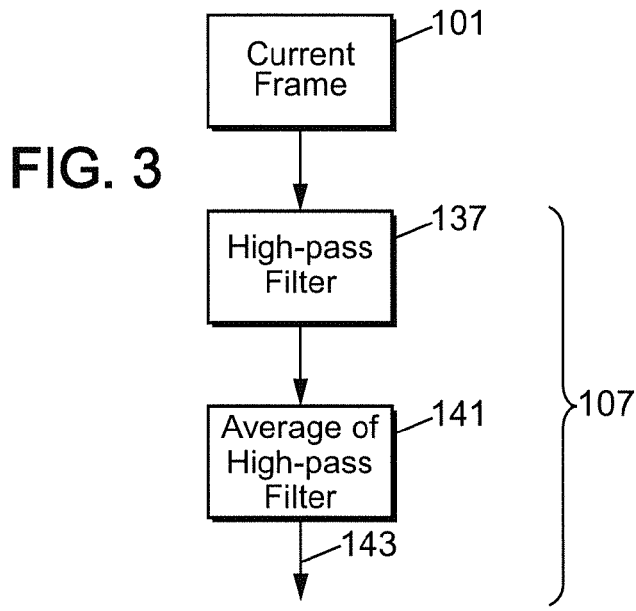
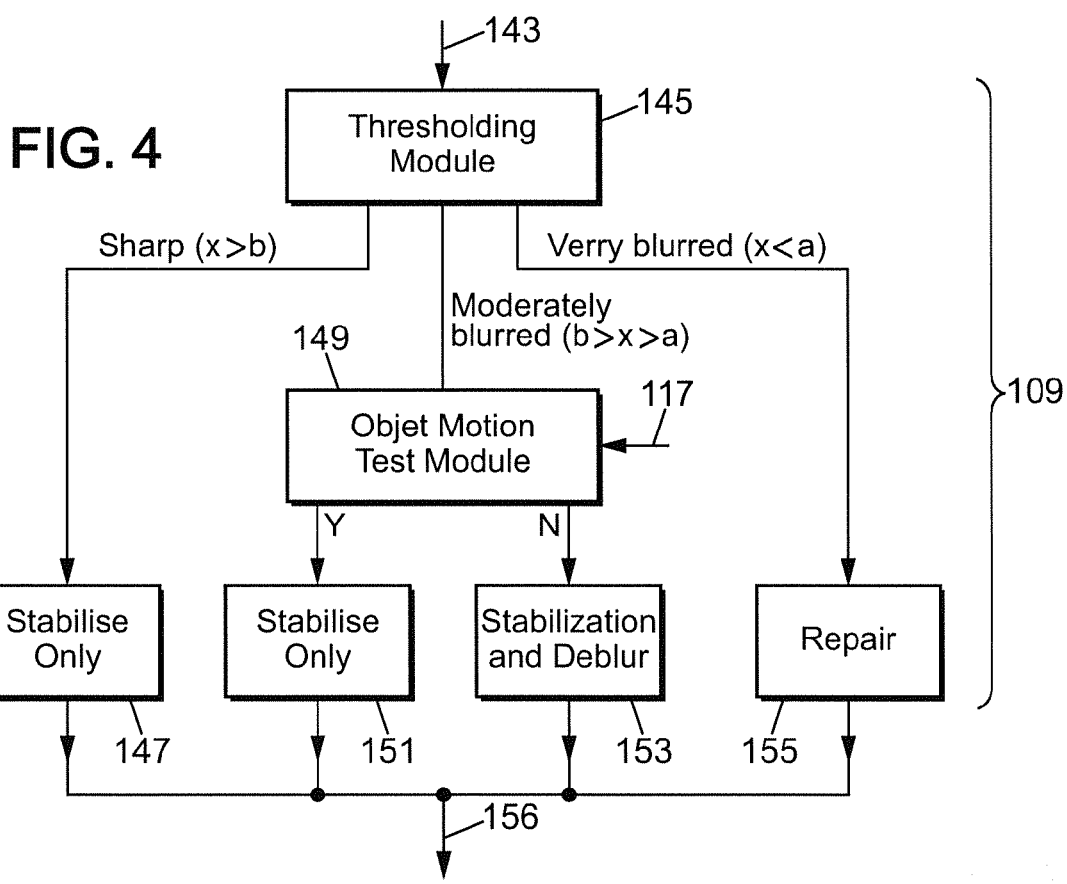

VIDEO STABILISATION WITH DEBLURRING

BACKGROUND

1. Technical Field

The embodiments described herein generally relate to methods for stabilising video images, and more particularly to stabilising video images in the presence of motion blur. The described embodiments also relate to an apparatus adapted for providing stabilised video images, and to a computer program product for performing the described methods.

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Techniques for the digital stabilisation of video sequences to remove the effect of unwanted camera motion are known in the art. For example, WO/2007/020569 discloses a method for removing unwanted camcorder movement, or jitter. In the method, a motion estimate between a previous frame and a current frame is made and subsequently the current frame is realigned to counteract this motion.

However, the use of such techniques can result in undesired artefacts being observed in the output sequence. For example, if a video sequence contains some frames which are blurred as a result of motion, then a "pumping" effect can be observed wherein isolated unfocussed frames are present in the sequence of otherwise focussed frames. This effect tends to be more obvious to the observer after stabilisation of the sequence has been implemented.

Deblurring of single still images is disclosed in, for example, R. L. Lagendijk and J. Biemond "Basic methods for Image Restoration and Identification", Handbook of Image and Video Processing, Elsevier Academic Press, editor Al Bovik, SD Edition 2005. However, such deblur algorithms suffer from the problem that it is difficult to estimate from a single image the motion that caused the blurring in the image. Additionally, motion deblur algorithms are generally sensitive to problems caused by the presence of moving objects within the scene. As a result, artefacts are often observed in a deblurred image.

It is an object of the embodiments herein described to obviate at least some of the disadvantages described above.

SUMMARY

In a first aspect, the embodiments provide a method of processing a frame in a video sequence of digital images, the method comprising: determining a global motion vector for the frame relative to a previous frame in the sequence; deriving a jitter function from the global motion vector, the jitter function comprising an estimate of undesired motion of the frame relative to the previous frame; determining whether the frame is blurred above a first predetermined threshold; and if so, stabilising the frame using the jitter function and applying a deblur function to the frame.

By applying a deblur function to the stabilised frame, the effect of 'pumping' that is often observed as a result of stabilisation, can be avoided.

In embodiments, the method can further comprise determining whether a moving object is present in the frame, and if so, and the frame is determined to be blurred above the first predetermined threshold, stabilising the frame without applying the deblur function. Thus, advantageously, the method can avoid deblurring frames containing local motion blur.

In embodiments, the method further comprises determining whether a moving object is present in the frame and, if not, and the frame is determined to be blurred above the first predetermined threshold, stabilising the frame and applying the deblur function. Thus, advantageously, the method can ensure that blurred frames without local motion blur are deblurred.

In embodiments, the method comprises determining whether the frame is blurred above a first predetermined threshold and, if not, stabilising the frame without applying the deblur function. Thus, advantageously, the method can avoid unnecessarily deblurring frames that are not blurred.

In embodiments, the kernel size for the deblur function is proportional to the global motion vector determined for the frame. Thus, advantageously the deblur function is matched to the magnitude of the blur for which it is to compensate.

In embodiments, the detection of the presence of blur in the frame can be achieved by applying a high-pass filter to the frame. In embodiments, the high-pass filter can be a Laplacian filter. The high-pass filter can be applied over a small window size. The window size can be of the order two pixels. The high-pass filter can be applied in either a horizontal direction or a vertical direction, or alternatively in both horizontal and vertical directions.

In embodiments, an overall sharpness measure of the frame is obtained by generating an average of the absolute values of the high-pass filter over part or all of the frame.

In embodiments, if the frame is determined to be blurred above a second predetermined threshold, the second threshold indicating that the frame is more blurred than the first threshold, then the frame is repaired.

In embodiments, the frame is repaired by determining whether the previous frame in the sequence is blurred above the second threshold, and if not, replacing the frame with the previous frame. Alternatively, in embodiments the frame is repaired by determining whether the subsequent frame in the sequence is blurred above the second threshold, and if not, replacing the frame with the subsequent frame. Alternatively, in embodiments the frame is repaired by determining whether the subsequent frame in the sequence is blurred above the second threshold, and if not, replacing the frame with a temporal upconversion of the previous and the subsequent frames.

Thus, advantageously if a frame is deemed to be too blurred, it can be replaced with a less blurred frame.

In embodiments, a blurred frame can be replaced with a frame that is not adjacent to the frame in question, but merely close to the frame in the sequence.

In embodiments, the method is repeated for substantially all of the frames in the sequence. Thus, a stabilised video sequence can be generated.

In a second aspect, the described embodiments provide a computer program product comprising computer readable code which, when implemented on a processor causes the processor to perform any of the methods described herein.

In embodiments, the computer program product is embodied on a computer readable medium. The computer readable medium can, for example comprise a storage medium.

In a third aspect, the embodiments provide a device for processing a frame in a video sequence of digital images, the device comprising a processor configured to: determine a global motion vector for the frame relative to a previous frame in the sequence; derive a jitter function from the global motion vector, the jitter function comprising an estimate of undesired motion of the frame relative to the previous frame; determine whether the frame is blurred above a first predetermined threshold; and if so, stabilising the frame using the jitter function and applying a deblur function to the frame.

In embodiments, the device comprises one of a digital still camera, a digital camcorder or a mobile telephone including a digital camera.

BRIEF DESCRIPTION OF THE DRAWINGS

Embodiments are illustrated by way of example, and not by way of limitation, in the figures of the accompanying drawings, in which like reference numerals refer to similar elements and in which:

FIG. 3 illustrates detail of the sharpness measure module of FIG. 1;

FIG. 4 illustrates detail of the deblur decision module of FIG. 1;

DETAILED DESCRIPTION

Figure 1:
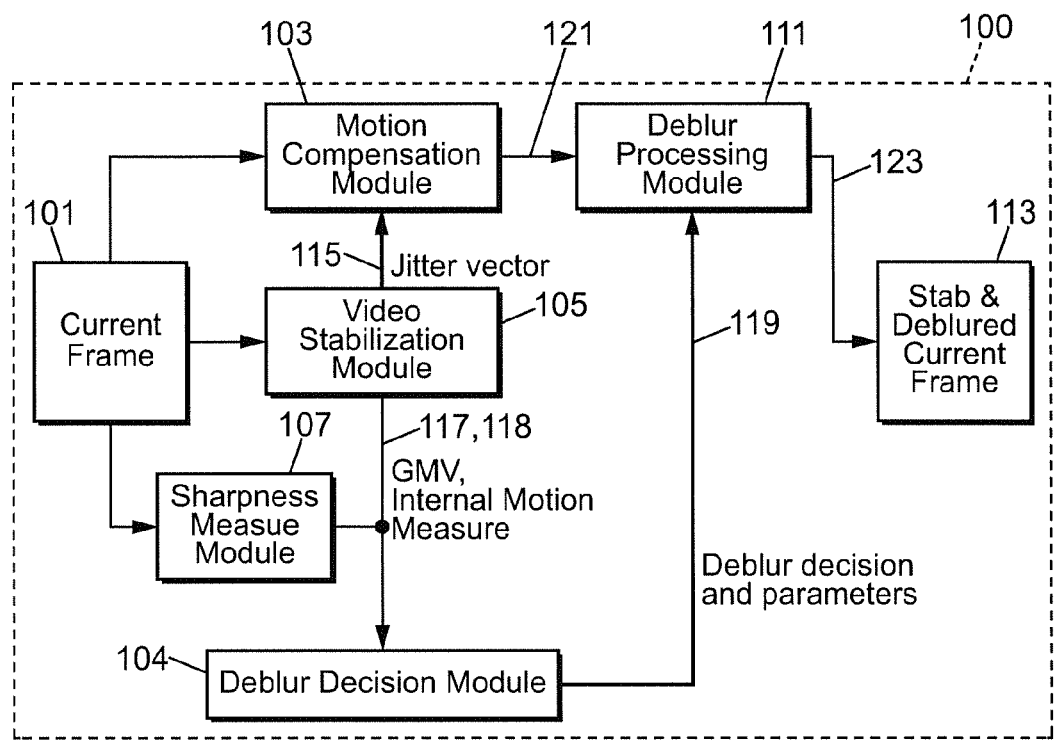
FIG. 1 is a schematic illustration of an algorithm according to a first embodiment as embodied in a device.

FIG. 1 illustrates a simplified view of the algorithm according to the presently described embodiment as embodied in a device 100. The device 100 can be any electronic device configured to receive or generate a video sequence.

The algorithm begins with the receipt of a current frame 101 of a video sequence. The current frame 101 is processed by three processing modules; a video stabilisation module 105, a motion compensation module 103 and a sharpness measuring module 107.

The video stabilisation module 105 has two outputs, a jitter vector 115 and a Global Motion Vector (GMV) 118. The jitter vector 115 contains a measure of the undesired motion, or jitter, present in the processed current frame 101, while the GMV 118 contains a measure of the motion within the frame including the jitter. The jitter vector 115 and the GMV 118 will be explained in more detail below.

The jitter vector 115 output from the video stabilisation module 105 is applied as a further input to the motion compensation module 103 to generate a version of the current frame 101 in which the motion due to jitter has been compensated. This jitter-compensated frame 121 is output from the motion compensation module 103. The process of jitter compensation will be explained in more detail below.

In conjunction with the GMV 118, the output from the sharpness measuring module 107 is applied to a deblur decision module 109 to determine whether deblurring needs to be applied to the current frame 101. Again, further details of the deblur decision module 109 are provided below.

This decision 119 made by the deblur decision module 109 is applied to a deblur processing module 111. The deblur processing module 111 also receives the jitter-compensated frame 121 from the motion compensation module 103 as a further input. On the basis of the decision 119, the deblur processing module 111 determines a processing to be applied to the jitter-compensated frame. Further details of this processing are given below.

The stabilised and deblurred frame 123 is then output from the deblur processing module 111, and forms the output 113 from the algorithm.

The above process is repeated for each frame within a video sequence to be processed, with the exception of the first frame. The first frame is used only for comparison with the second frame to derive the various parameters related to the motion of the frame.

Figure 2:
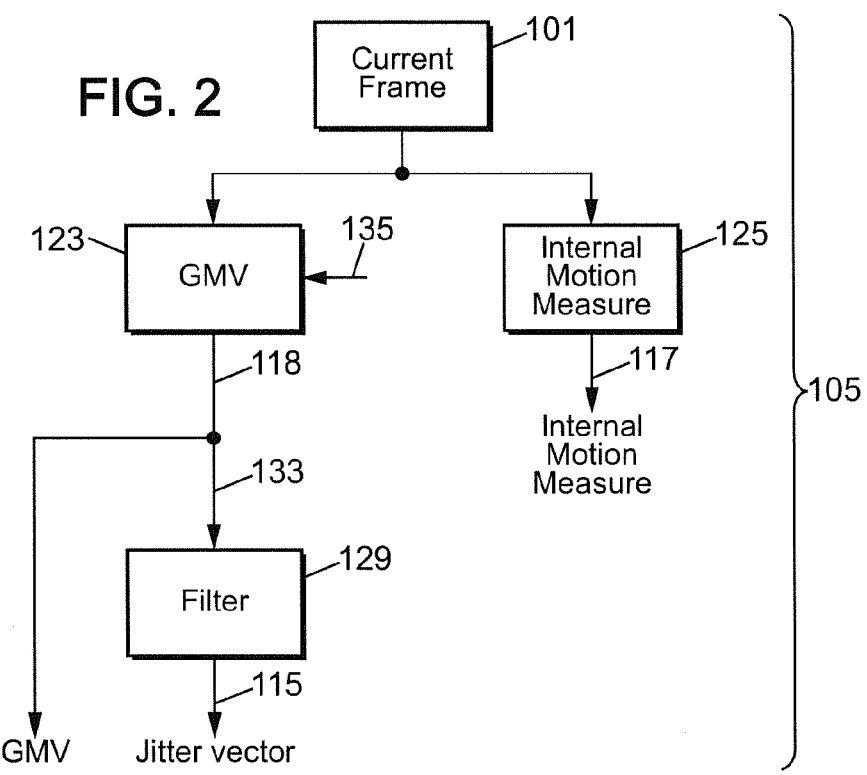
FIG. 2 illustrates details of the video stabilisation module of FIG. 1.

FIG. 2 illustrates further detail of the video stabilisation module 105.

The current frame 101 is input to both a GMV module 123 and an internal motion module 125.

The GMV module 123 extracts the GMV of the current frame in pixel units. The measure of the GMV is made relative to the previous frame, thus, the GMV module 123 receives as a further input 135 the previous frame. The extraction of the GMV is made using techniques known in the art of which the skilled person will be aware. The precise method by which the GMV is obtained is not important to the functioning of the described embodiment.

The GMV module outputs 118 the GMV to both a filter 129 and to a storage unit (not illustrated). The storage unit retains the GMV 118 for the current frame 101 for use with the subsequent application of the algorithm with the next frame in the sequence.

The filter 129 filters the GMV 118 in time to retain only intentional motion, such as panning of a scene. The skilled person will be aware of filters in the prior art that can be used for this purpose, and so the exact method of filtering will not be described here. The output 115 of the filter 129 is a jitter vector, which defines the undesirable motion in the current frame 101.

The internal motion module 125 performs a measure of the internal motion within the frame 101, to detect the presence of moving objects within the frame 101. This is achieved by computing the global disparity between all macroblock motion vectors of the frame 101 in comparison to the calculated GMV for the frame 101. The internal motion measure 117 resulting from this calculation is output for later use as will be explained below.

FIG. 3 illustrates details of the sharpness measuring module 107. As described above, the sharpness measuring module 107 receives the current frame 101. A high-pass filter 137 is then applied to the frame. For this purpose, a Laplacian filter is used. However, the skilled person will recognise that the particular type of high-pass filter used is not critical to the function of the described embodiment.

The high-pass filter is applied over a small window in the frame, of the order of two to three pixels. The average of the absolute value of the output from the high-pass filter 137 is then calculated over the entire filtered frame. This yields a measure of the sharpness of the current frame 101.

FIG. 4 illustrates the deblur decision module 109 in detail. A threshold module 145 applies thresholds to the output 143 of the sharpness measuring module 107. Two thresholds, a and b are set for the output value, x. The higher threshold is b, while the lower threshold is a.

If the sharpness, x is above the upper threshold (i.e. x>b), then the frame is deemed to be sharp. If the sharpness, x, is between the upper and lower thresholds (i.e. if b>x>a) then the frame is deemed to be moderately blurred. If the sharpness, x, is below the lower threshold (i.e. x<a), then the frame is deemed to be very blurred.

If the frame 101 is deemed to be sharp (x>b), then the deblur decision module 109 will determine that the frame should not be deblurred, but that it will be stabilised. This decision is output as an indicator 147 to the effect that stabilisation only should be applied to the frame 101.

If the frame 101 is deemed to be moderately blurred (b>x>a), then an object motion test module 149 tests for the presence of moving objects in the frame 101. For this test, the internal motion measure 117 derived by the video stabilisation module 105 is used. If the internal motion measure 117 is above a predetermined threshold, then the internal motion test module 149 determines that there are moving objects in the frame 101. In this event, the deblur decision module 109 again outputs an indicator 151 that the frame 101 should be stabilised but not deblurred. If the internal motion measure 117 is below the predetermined threshold, then the internal motion test module 149 determines that there are no moving objects in the frame 101. In this event, the deblur decision module 109 outputs an indicator 153 that the frame 101 should be both stabilised and deblurred.

If the frame is deemed to be very blurred (x<a), then the deblur decision module 109 outputs an indicator 155 that the frame 101 should be repaired, but neither stabilised nor deblurred. The details of the repair process will be described below in relation to FIG. 6.

The particular indicator output 156 by the deblur decision module 109 is then passed to the deblur processing module 111.

Figure 5:
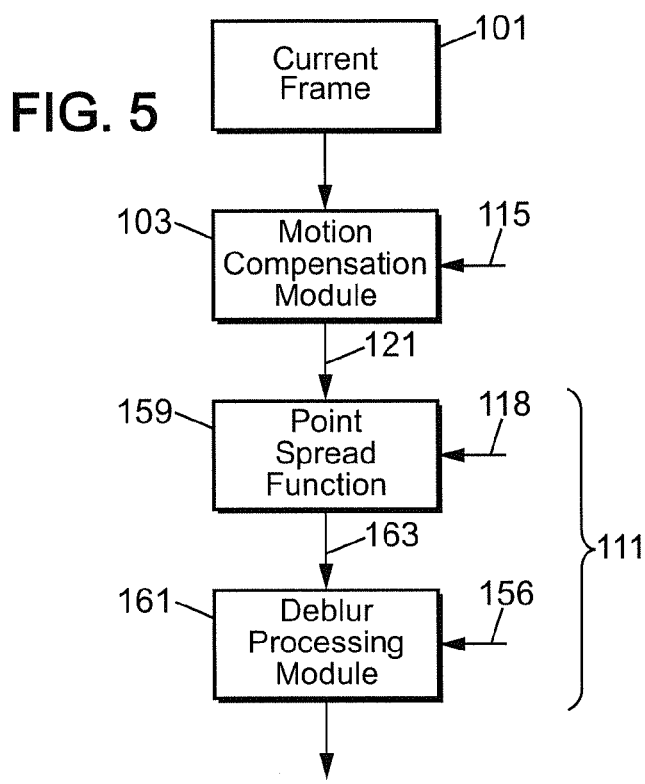
FIG. 5 illustrates detail of the motion compensation and deblur processing modules of FIG. 1.

FIG. 5 illustrates details of the deblur processing module 111 and motion compensation module 103. To stabilise the frame 101, the frame 101 is passed to the motion compensation module 103. The motion compensation module 103 also receives the jitter vector 115 calculated by the video stabilisation module 105. The motion compensation module 103 calculates the inverse of the jitter vector 115, and applies this to the current frame 101 to yield a jitter-compensated frame 121 as an output frame 113.

If the indicator 156 received from the deblur decision module 109 indicates that stabilisation but not deblur processing should be carried out, then the stabilised (jitter-compensated) frame 121 is passed through the deblur processing module 111 and forms the output frame 113. If the indicator 156 indicates that both stabilisation and deblurring should be carried out, then the motion compensated frame 157 is passed to a point spread function (PSF) estimator 159.

The PSF estimator 159 estimates the PSF of the jitter-compensated frame 121. Processes for estimating the PSF are known in the art, and so a full description will not be repeated here. Instead, it is sufficient to note that the PSF estimator 159 woks on the assumption that the camera has moved in a linear fashion at a constant speed between a previous frame and the current frame 101. The motion amplitude is considered to be proportional to the GMV 118 calculated by the video stabilisation module 1105. Thus, the PSF estimator 159 receives the GMV 118 as an input, and outputs an estimated PSF 163. The skilled person will recognise how to perform such a calculation, and so the details will not be provided here.

After the PSF has been calculated, the jitter-compensated frame 121 undergoes deblur using the estimated PSF 163. Again, the skilled person will recognise how to apply deblur processing using a PSF estimation, and so the details will not be presented here.

The resulting stabilised and deblurred frame then forms the output frame 113. Since the frame is both stabilised and deblurred, the problem of "pumping", wherein individual frames, which suffer from motion blur, appear blurred while the remainder of the video is sharp, is reduced.

Figure 6:
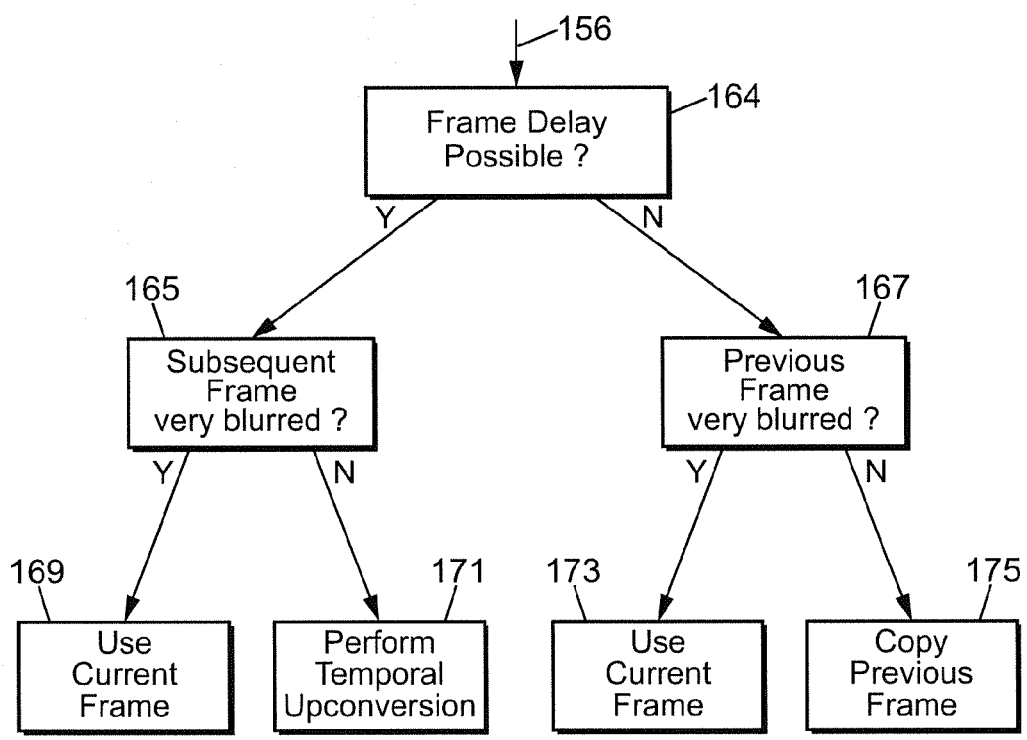
FIG. 6 illustrates detail of the frame repair process implemented by the deblur processing module of FIG. 1.

If the received indicator 156 indicates that the frame should be repaired then the deblur processing module 111 implements a repair process. The repair process is illustrated in FIG. 6. Firstly, the deblur processing module determines 164 whether a frame delay is acceptable. For example, if the implementation relates to the processing of live video, then a frame delay is generally not acceptable. However, if the implementation relates to the post-processing of pre-recorded video, then a delay of a single frame may well be acceptable.

If a frame delay is not acceptable, then the deblur processing module 111 determines 167 whether the indicator it received in respect of the previous frame indicated that the previous frame should be repaired. If not, then the frame output during the previous instance of the algorithm is copied and used 175 as the output frame 113.

If the result of the determination 167 is that the previous frame should also be repaired, then the deblur processing module 111 determines 173 that no deblurring improvement can be made to the current frame 101. The current frame 101 is then treated as described above for the situation wherein the indicator 156 received from the deblur decision module 109 indicated that stabilisation but not deblur processing should be carried out. Accordingly, the jitter-compensated frame 121 is passed through the deblur processing module 111 and forms the output frame 113.

If a frame delay is determined 164 to be acceptable, then the deblur processing module 111 determines 165 whether the indicator in respect of the subsequent frame indicates that the subsequent frame should be repaired. If the result of this determination 165 is that the subsequent frame should not be repaired, then a temporal upconversion is performed 171 on the previous and subsequent frames, the output from which is used as the output frame 113. The skilled person will recognise how to perform a temporal upconversion on the previous and subsequent frames, and so the details of this process will not be repeated here.

If the result of the determination 165 is that the subsequent frame should also be repaired, then the deblur processing module 111 determines 169 that no deblurring improvement can be made to the current frame 101. The current frame 101 is then treated as described above for the situation wherein the indicator 156 received from the deblur decision module 109 indicated that stabilisation but not deblur processing should be carried out. Accordingly, the jitter-compensated frame 121 is passed through the deblur processing module 111 and forms the output frame 113.

In an alternative or complimentary embodiment the GMV includes a measure of rotational motion and/or image zoom between frames.

In a further or complimentary embodiment, the device 100 in which the algorithm as described above is implemented is an electronic circuit.

In a further or complimentary embodiment the device 100 in which algorithm as described above is implemented is a digital still camera or a digital camcorder.

In a further or complimentary embodiment the device 100 in which the algorithm as described above is implemented is a video processing device.

In a further or complimentary embodiment the device 100 in which the algorithm as described above is implemented is a general processing device, such as a personal computer, suitably programmed to implement the algorithm as described above.

It is to be understood that the algorithms as described above are both applicable to the stabilisation of live image sequences, and also to the stabilisation of pre-recorded image sequences.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above. In particular, the embodiments describe above could be combined.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

It is to be understood that the methods of the described embodiments can be implemented in hardware, or in software or in some combination of both hardware and software. A single piece of hardware or software can carry out several of the functions as described. The hardware and/or software items can be implemented in several manners, such as by means of wired electronic circuits or by means of an integrated circuit that is programmed accordingly.

It is stipulated that the reference signs in the claims do not limit the scope of the claims, but are merely inserted to enhance the legibility of the claims.

The invention claimed is:

1. A method of processing a frame in a video sequence of digital images, the method comprising:
   determining a global motion vector for the frame relative to a previous frame in the video sequence;
   deriving a jitter function from the global motion vector, the jitter function comprising an estimate of an undesired motion of the frame relative to the previous frame;
   determining whether the frame is blurred above a first predetermined threshold; and
   if the frame is blurred above the first predetermined threshold, stabilising the frame using the jitter function and applying a deblur function to the frame.

2. The method according to claim 1, further comprising determining whether a moving object is present in the frame, and if the moving object is present in the frame, and the frame is determined to be blurred above the first predetermined threshold, stabilising the frame without applying the deblur function.

3. The method according to claim 2, wherein if no moving object is present in the frame, and the frame is determined to be blurred above the first predetermined threshold, stabilising the frame and applying the deblur function.

4. The method according to claim 1, further comprising if the frame is not blurred above the first predetermined threshold, stabilising the frame without applying the deblur function.

5. The method according to claim 1, wherein the determining of whether the frame is blurred comprises applying a high-pass filter to the frame.

6. The method according to claim 5, wherein the high-pass filter comprises a Laplacian filter.

7. The method according to claim 1, further comprising:
   repairing the frame if the frame is determined to be blurred above a second predetermined threshold, the second threshold indicating that the frame is more blurred than the first threshold.

8. The method according to claim 7, wherein the repairing of the frame comprises determining whether the previous frame is blurred above the second threshold, and if the previous frame is not blurred above the second threshold, then the frame is replaced with the previous frame.

9. The method according to claim 7, wherein the repairing of the frame comprises determining whether a subsequent frame is blurred above the second threshold, and if the subsequent frame is not blurred above the second threshold, then the frame is replaced with a temporal upconversion of the previous frame and the subsequent frame.

10. The method according to claim 1, wherein operations of the method are repeated for substantially all frames in the sequence.

11. The method according to claim 1, wherein a kernel size for the deblur function is proportional to the global motion vector determined for the frame.

12. A non-transitory computer readable storing medium storing computer readable code which, when implemented on a processor causes the processor to perform the method according to claim 1.

13. A device for processing a frame in a video sequence of digital images, the device comprising: a processor configured to:
   determine a global motion vector for the frame relative to a previous frame in the video sequence;
   derive a jitter function from the global motion vector, the jitter function comprising an estimate of an undesired motion of the frame relative to the previous frame;
   determine whether the frame is blurred above a first predetermined threshold; and
   if the frame is blurred above the first predetermined threshold, to stabilize the frame using the jitter function and applying a deblur function to the frame.

14. The device according to claim 13, wherein the device further comprises one of a digital still camera, a digital camcorder or a mobile telephone including a digital camera.

* * * * *